United States Patent [19]
Archer

[11] Patent Number: 5,640,423
[45] Date of Patent: Jun. 17, 1997

[54] METHOD FOR SIGNAL TRANSMISSION USING SPECTRALLY EFFICIENT ORTHOGONAL MODULATION

[75] Inventor: Teri L. Archer, Sunnyvale, Calif.

[73] Assignee: Signal Science, Inc., Santa Clara, Calif.

[21] Appl. No.: 168,590

[22] Filed: Dec. 16, 1993

[51] Int. Cl.$^6$ ................................ H04L 5/12; H03C 3/00
[52] U.S. Cl. ........................ 375/261; 375/298; 332/103
[58] Field of Search ........................... 375/261, 266, 375/298, 340, 295; 332/103; 329/304

[56] References Cited

U.S. PATENT DOCUMENTS

| | | | |
|---|---|---|---|
| 4,646,325 | 2/1987 | Furanski et al. | 375/266 |
| 5,253,271 | 10/1993 | Montgomery | 375/295 |
| 5,343,499 | 8/1994 | Jasper et al. | 375/261 |
| 5,363,408 | 11/1994 | Paik et al. | 332/103 |
| 5,381,449 | 1/1995 | Jasper et al. | 375/298 |
| 5,425,050 | 6/1995 | Schreiber et al. | |

OTHER PUBLICATIONS

Saha, Debabrata and Theodore G. Birdsall, "Quadrature–Quadrature Phase–Shift Keying, 1989 IEEE Transactions on Communications", vol. 37, No. 5, May 1989.

Papoulis, Athanasios, "Signal Analysis", Copyrighted 1977, McGraw–Hill, Inc., pp. 205–215.

Press, William H, et al., "Numerical Recipes, The Art of Scientific Computing", Cambridge University Press, undated, p. 600.

Hirosaki, Botaro et al., "Advanced Groupband Data Modem Using Orthogonally Multiplexed QAM Technique", IEEE Transactions on Communications, vol. Com–34, No. 6, Jun. 1986, pp. 587–592.

Hirosak, Botaro, "An Orthogonally Multiplexed QAM System Using the Discrete Fourier Transform", IEEE Transactions on Communications, vol. Com–29, No. 7, Jul., 1981, pp. 982–989.

Chang, Robert W., "Synthesis of Band–Limited Orthogonal Signals for Multichannel Data", The Bell system Technical Journal, Dec., 1966, pp. 1775–1797.

Khalona, Ramon A., et al., "On the Performance of a Hybrid Frequency and Phase Shift Keying Modulation Technique", IEEE Transactions on Communications, vol. 41, No. 5, May, 1993, pp. 655–659.

Aaron D. Wyner, "Signal Design for PAM Data Transmission to Minimize Excess Bandwidth", Bell System Technical Journal, vol. 57, No. 9, pp. 3277–3307, Nov. 1978.

Aaron D. Wyner, "An Analog Scrambling Scheme which Does Not Expand Bandwidth, Part 1: Discrete Time", IEEE Transactions on Information Theory, vol. IT–25 No. 3, pp. 261–274, May 1979.

*Primary Examiner*—Edward L. Coles, Sr.
*Assistant Examiner*—Kimberly A. Williams
*Attorney, Agent, or Firm*—Skjerven, Morrill, MacPherson, Franklin & Friel; Edward C. Kwok

[57] ABSTRACT

A structure and a method for transmitting digital data modulate the amplitude and the phase of a set of orthogonal band-limited finite duration waveforms. In one embodiment, a group of information symbols modulate in parallel a set of spectrally efficient orthogonal waveforms, known as prolate spheroidal wave functions. The modulated orthogonal waveforms are summed, and the resulting composite signal then modulates a carrier signal for transmission. The compressed spectrum modulated signal provides a robust data waveform which reduces the spectral bandwidth requirements compared to digital modulation formats employed in the prior art. The transmitter and the receiver for modulating and demodulating the orthogonal waveforms for transmission operate at slower speeds than corresponding equipment of existing modulation schemes of comparable symbol rate. Consequently, both simplicity of design and cost savings are realized in a compressed spectrum modulation scheme.

23 Claims, 4 Drawing Sheets

METHOD FOR SIGNAL TRANSMISSION USING SPECTRALLY EFFICIENT ORTHOGONAL MODULATION

BACKGROUND OF THE INVENTION

1. Field of the Invention

The present invention relates to a modulating method for transmitting digital data through a communication channel and a demodulating method for recovering the transmitted digital data at a receiver.

2. Discussion of the Related Art

The demand for bandwidth on the radio frequency spectrum is dramatically increasing with emerging communication technologies, including personal communication networks, cellular telephones, and mobile computing. As these technologies mature, ever increasing amounts of data are transmitted using the limited spectral resources.

Successful digital transmission requires that the spectrum width of the transmitted signal be confined to the available bandwidth in the channel. Information theory has demonstrated that the rate at which digital information can be transmitted through a communication channel cannot exceed the channel capacity C, which is defined by the equation:

$$C = B \ln(1 + S/N),$$

where S/N is the signal-to-noise ratio, and B is the available bandwidth of the channel. Because the signal-to-noise ratio is limited by the physical characteristics of the channel and the communication equipment, improvement to the signal-to-noise ratio is mostly not achieved by improving the coding scheme. A coding scheme may, however, improve the utilization of the bandwidth B, and thereby increase the data rate achievable. Thus, in the prior art, a number of coding schemes have been devised to better utilize the available bandwidth.

A digital modulation method is a coding scheme which represents an information stream by symbols defined using the values of a known signal's amplitude, phase, frequency parameters, or a combination of these parameters. Many digital modulation methods modulate a sinusoidal signal. One example of a digital modulation method is the phase shift-key (PSK) modulation in which the phase of a carrier signal is modulated by a symbol to be transmitted. Similarly, in amplitude shift-key (ASK) modulation, the amplitude of a carrier is modulated by a symbol to be transmitted. In a quadrature-amplitude (QAM) modulation, both the amplitude and the phase of a carrier are modulated by a symbol to be transmitted. In frequency shift-key (FSK) modulation, both the frequency and the phase of a carrier are modulated by a symbol to be transmitted.

Each modulation scheme used in the prior art falls substantially into one of the following three categories: (i) quadrature amplitude and phase modulation, (ii) m-ary orthogonal signaling, (iii) simultaneous transmission of orthogonal sinusoids.

A simple conventional phase modulation scheme is the binary PSK modulation, or BPSK modulation. In BPSK modulation, each symbol represents one of the two values of a single bit (i.e. '0' or '1'). In BPSK, each symbol is encoded as a specific phase of the carrier signal, e.g. 0 degree or 180 degrees. The amplitude spectrum of the BPSK signal is a sinc function (i.e., sin(x)/x) whose 3 dB bandwidth is 1/T Hz, where T is the duration of each symbol.

To increase the number of bits transmitted through a fixed bandwidth, more complex modulation schemes are used to increase the number of bits represented by a symbol, so that more than one bit is transmitted during each symbol interval T. One example of such schemes is the quadrature PSK (QPSK) modulation, under which each symbol encodes two bits of information. The QPSK scheme uses 4 phase states (e.g. 0°, 90°, 180°, and 270°) to represent the four possible values of two bits: 00, 01, 10, 11. The amplitude spectrum of the QPSK signal, like the BPSK signal, is a sinc function with a 3 dB bandwidth of 1/T Hz. However, under QPSK, two bits of information are transmitted for each symbol interval.

Higher order modulation schemes increase the number of bits encoded by a symbol. Typically, under such a higher order scheme, a symbol is represented by one of a large number of amplitude and phase states. For example, under a 16-QAM scheme, sixteen amplitude and phase states are used to define 16 distinct symbols. Thus, under the 16-QAM scheme, four bits of information are transmitted per symbol interval. 16-QAM occupies the same bandwidth as the BPSK signal.

Each of the digital modulation methods mentioned above uses modulation of a single carrier signal. Other methods exist in the prior art which represent a symbol of information during a single symbol interval using one or more carrier signals. One class of schemes using more than one carrier signal is referred to as "m-ary orthogonal signaling". M-ary orthogonal signaling uses orthogonal waveforms to represent information symbols. One example is the binary frequency shift-key ("binary FSK") scheme, under which one of two orthogonal frequency states is transmitted per symbol interval. One frequency state, represented by one of the two orthogonal frequencies, encodes a bit value of '0'; the other frequency state, represented by the other of the two orthogonal frequencies, encodes a bit value of '1'. At the receiver, a matched filter is provided for each of the orthogonal waveforms to determine which bit value was transmitted during a particular symbol interval. M-ary orthogonal signaling can transmit more than one bit during a symbol interval by assigning a bit pattern to each othogonal waveform. The receiver then uses a parallel bank of matched filters to recover which of the orthogonal waveform was transmitted. Under m-ary orthogonal signalling, each matched filter detects the energy of one of the orthogonal waveforms. During any given symbol interval, since only one of the orthogonal waveforms is transmitted, only one of the matched filters should detect significant signal energy.

Under a scheme for simultaneous transmission of orthogonal sinusoids, N time-limited filtered complex sinusoids are transmitted in parallel, where N is an integer greater than or equal to two. The N complex sinusoidal frequencies are spaced by the symbol rate (i.e., 1/T, where T is the symbol interval). Because the sinusoid frequencies are weighted by a finite impulse response filter, the resulting transmission channel consists of N spectrally overlapping sub-channels or sub-bands. The amounts of spectral overlap are determined by the spectral shape of the filter.

Examples of simultaneous transmission of orthogonal sinusoids include (i) "An Orthogonal Multiplexed QAM System Using the Discrete Fourier Transform" by B. Hirosaki, *IEEE Transactions on Communications*, Vol. Com-29, No. 7, July 1981, pp.982–89; (ii) "Advanced Groupband Data Modem Using Orthogonal Multiplexed QAM Technique" by B. Hirosaki et al, *IEEE Transactions on Communications*, Vol. Com-34, No. 6, June 1986, pp. 587–92; and (iii) "Synthesis of Band-Limited Orthogonal Signals for Multichannel Data Transmission," by R. Chang, *Bell System Technical Journal*, December 1966, pp. 1775–96.

One disadvantage of these schemes for simultaneous transmission of orthogonal sinusoids is the interchannel interference resulting from the overlapping spectra. Interchannel interference can be mitigated by using a filter having a narrower spectrum, or equivalently, a filter having a longer duration on each orthogonal sinusoid. However, a longer duration filter requires more computation and spans more symbol intervals, thereby resulting in the possibility of intersymbol interference. Finally, methods for simultaneous transmission of orthogonal sinusoids are often designed to be multiplexing schemes for combining data from multiple data streams for transmission in a single channel. The filtering required under such methods often involves multiple symbols, thereby complicating the application of these methods to a single stream of data.

Hybrid Frequency and Phase Shift Keying (FPSK) is another scheme for simultaneous transmission of orthogonal sinusoids. Unlike the other schemes for simultaneous transmission of orthogonal sinusoids discussed above, FPSK multiplexes a single data stream. Under FPSK, each complex sinusoidal basis function is modulated by conventional PSK, and the number of basis functions is typically chosen to be two or four. One implementation of FPSK modulation is described in "On the Performance of a Hybrid Frequency and Phase Shift Keying Modulation Technique", by Khalona et al, *IEEE Transactions of Communications*, Vol. 41, No. 5, May 1993, pp. 655–659. The complex sinusoids in Khalona's FPSK scheme are not individually filtered, as is done in the other methods for simultaneous transmission of orthogonal sinusoids described above. However, filtering the composite signal is consistent with the methods for simultaneous transmission of orthogonal sinusoids.

Several techniques have been applied at the transmitter to improve the spectral efficiency of digitally modulated signals. One technique applies a bandpass filter to a modulated signal prior to transmission to minimize frequency sidelobes. Another technique, called "partial response", passes the symbols through bandpass filters to achieve spectral shaping and to introduce spectral nulls.

Yet another technique, known as "continuous phase modulation", is applicable to FSK formats. In continuous phase modulation, each symbol is represented by a sinusoid selected such that an integral number of cycles of that sinusoid fits into the symbol duration. Consequently, by starting each symbol at the same phase, phase discontinuities at the symbol boundary are avoided. Avoiding phase discontinuity is desirable, since a phase discontinuity creates high frequency components in the modulated signal. When filtering is applied to such a modulated signal to obtain a band-limited signal, the attenuation of the high frequency components necessarily creates distortion in the amplitude or envelope of the filtered signal. Minimum shift keying (MSK) is a special case of continuous phase modulation of FSK.

Both the transmission of a digitally modulated signal through a band-limited communication channel (i.e., a kind of bandpass filtering) and the use of the partial response technique mentioned above result in intersymbol interference. The form of interference resulting from the partial response technique is known as "controlled" intersymbol interference. To compensate for intersymbol interference, including controlled intersymbol interference, a channel equalizer can be provided at the receiver.

Demodulation of conventional digital modulation formats includes the steps of (i) symbol synchronization to enable discrete sampling of the input waveform at symbol intervals, and (ii) carrier synchronization to down-convert the sampled signal to a baseband signal. Thereafter, the resulting baseband signal samples are equalized to compensate for channel distortion and interchannel interference. The equalizer is typically an adaptive digital filter having automatically adjustable filter weights. The equalizer can also be part of a decision-aided carrier tracking and down-conversion loop which centers the signal spectrum at 0 Hz. A decision processor is applied at the output of the equalizer to recover the information symbol from the equalized signal. In higher order modulation formats, the symbol is then converted to the bit or bits the symbol encodes.

SUMMARY OF THE INVENTION

In accordance to the present invention, a method and a circuit provide for spectrally efficient transmission of a digital signal. A transmitter of the present invention (i) encodes multiple data bits into multiple symbols under a conventional coding scheme; (ii) for each of these symbols, modulates the symbol for a time interval onto a corresponding one of a number of orthogonal waveforms; (iii) sums the modulated waveforms aligned in time to obtained a summed waveform; (iv) modulates the summed waveform for the same time interval as each individual modulation onto a carrier signal; and (v) transmits the modulated summed waveform in a channel.

In one embodiment, a buffer having N entries is used to store all symbols to be transmitted over the time interval. The buffer provides the symbols in parallel, so as to allow simultaneous modulation of the symbols onto corresponding orthogonal waveforms. In one embodiment, the orthogonal waveforms are selected from a set of prolate spheroidal wave functions.

In one embodiment, each symbol represents multiple bits, and each symbol is represented in a signal by either a phase, an amplitude, or both. Under this embodiment, each symbol modulates the phase, the amplitude, or both attributes, of the corresponding orthogonal waveform.

In accordance with one aspect of the present invention an orthogonal waveform of the present invention has a spectrum width less than the bandwidth of the intended communication channel.

In accordance with one aspect of the present invention, the receiver of the present invention (i) receives the transmitted signal; (ii) down-converts the transmitted signal to a baseband signal; and (iii) recovers the N symbols transmitted using N matched filters in parallel, each of the matched filters matching a corresponding one of the orthogonal waveforms.

In one embodiment of the present invention, a decision device is used to recover each transmitted symbol. In that embodiment, an equalizer is provided to equalize the output signal of each of the matched filters. The equalizer can be an adaptive equalizer with decision feed-back.

The present invention provides a compressed spectrum modulation format which improves upon the prior art by modulating optimally band-limited orthogonal waveforms in parallel to produce a more spectrally efficient modulated signal. The compressed spectrum modulation of the present invention does not experience intersymbol interference present in some prior art schemes for simultaneous transmission of orthogonal sinusoids, since the present invention does not require filtering prior to modulation onto the orthogonal waveforms. Further, because the compressed spectrum modulation of the present invention does not require symbol filtering, it can be simply applied to a single data stream.

The compressed spectrum modulation format of the present invention also affords greater protection of privacy over the prior art during transmission. Increased protection of privacy enhances the present invention's applicability to many applications where the interception and demodulation of the signal by unintended receivers are not desired.

The present invention is better understood upon consideration of the following detailed description and the accompanying drawings.

DETAILED DESCRIPTION OF THE PREFERRED EMBODIMENT

Figure 1:
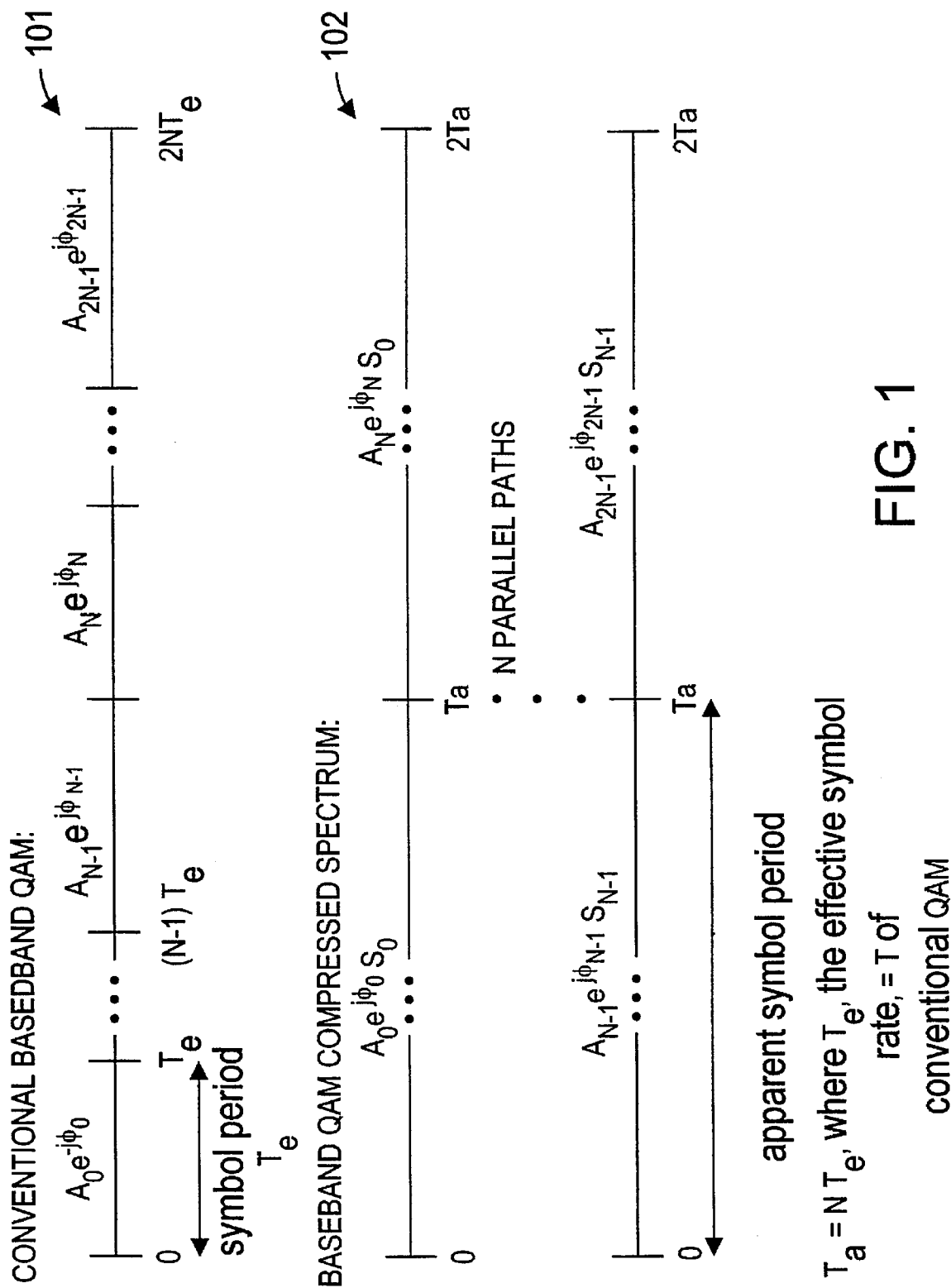
FIG. 1 provides timing diagrams showing 2N symbols being transmitted under both conventional $2^k$-QAM technique and the $2^k$-QAM compressed spectrum modulation of the present invention.

The present invention provides a "compressed spectrum" modulation format which modulates a large number of information symbols in parallel using optimal orthogonal waveforms to achieve a spectrally efficient modulated signal. The desirable orthogonal waveform is described below as substantially band-limited and of a substantially finite duration. Of course, a truly band-limited finite duration signal is theoretically impossible. However, there exists finite duration waveforms having high percentages of their energies concentrated in relatively narrow bandwidths. Such waveforms are referred to in this application as either "optimal" waveforms, or "substantially band-limited finite duration" waveforms.

One compressed spectrum modulation format, called the $2^k$-QAM compressed spectrum modulation format, is achieved by modulating N symbols using the amplitudes and phases of N orthogonal prolate spheroidal wave functions (PSWFs) in parallel. PSWFs are the eigenfunctions, or solutions, to the integral equation:

$$\int_{-\tau}^{\tau} \phi(x) \frac{\sin \sigma(t-x)}{\pi(t-x)} dx = \lambda \phi(t) \quad (1)$$

where the parameters $\tau$ and $\sigma$ are related by a constant c, such that $c=\tau\sigma$.

A discussion on the properties of PSWFs can be found in *Signal Analysis*, by A. Papoulis, pp. 205–212, McGraw Hill, 1977.

The integral equation (1) above has infinitely many solutions for $1>\lambda>0$. PSWFs exhibit "dual" orthogonality properties: PSWFs are orthogonal over the intervals $[-\infty, \infty]$ and $[-\tau, \tau]$. In other words, PSWFs satisfy the following 10 equations:

$$\int_{-\infty}^{\infty} \phi_k(t)\phi_n(t)dt = \begin{cases} 1, & k=n \\ 0, & k \neq n \end{cases} \quad (2)$$

$$\int_{-\tau}^{\tau} \phi_k(t)\phi_n(t)dt = \begin{cases} \lambda_n, & k=n \\ 0, & k \neq n \end{cases} \quad (3)$$

where $\phi_k$ and $\phi_n$ are the eigenfunctions of integral equation (1) for eigenvalues $\lambda_k$ and $\lambda_n$ respectively. The orthogonality property of PSWFs of equation (3) can be used to recover an individual finite duration PSWF from a linear combination of finite duration PSWFs, which are time-limited over the same interval $[-\tau, \tau]$. This property allows the selection of an optimal basis set[1] of real-valued PSWFs having substantially all their energies within a predetermined bandwidth. Such PSWFs are highly spectrally efficient, since a finite linear combination of these functions allow the optimal representation of finite duration functions, within the predetermined bandwidth, as compared to finite linear combinations of other basis sets. This spectral efficiency results because PSWFs form a "complete orthogonal basis set"[2] for finite-duration signals. In the present embodiment, PSWFs are chosen over other sets of mutually orthogonal functions because PSWFs more efficiently occupy the available bandwidth than other suitable basis functions considered.

[1] A set S of function $(S_0, S_1, \ldots, S_{N-1})$ is said to be a basis set if the function in the set are linearly independent, i.e.

$$\sum_{i=0}^{N-1} a_i S_i = 0,$$

only if all coefficients $a_i=0$. Further, such a basis set is said to be orthogonal if, for any pair of functions $S_i$ and $S_j$ in S, $$\int_{-\infty}^{\infty} S_i S_j dt = \begin{cases} b_i, & i=j \\ 0, & i \neq j \end{cases}$$

where $b_i$ is a constant
[2] An orthogonal set of basis functions within a function space is complete if there are no additional non-zero functions in the function space that are orthogonal to each basis function in the set. Furthermore, any function in the function space can be constructed as a linear combination of member functions of the complete basis set. See, e.g., *Signal Theory*, by L. E. Franks, Dowden & Culver Inc., 1981 (Revised Edition), §3.2.

In accordance with the present invention, a number of PSWFs $(S_0, S_1, \ldots, S_{N-1})$ are chosen to form an orthonormal set S of basis functions. A convenient way for generating the selected PSWFs can be found in section 16.4 of *Numerical Recipes, the Art of Scientific Computing*, edited by William H. Press et al., and published by Cambridge University Press. The above referenced section of Numerical Recipes provides both a discussion of an algorithm to solve for the PSWFs and a computer program for obtaining such a solution[3].

[3] In the referenced section 16.4 of *Numerical Recipes*, the PSWFs are solved by the differential form of equation (1) above.

By definition, the PSWFs in this orthonormal set S are orthogonal, i.e., any pair of PSWFs in this orthonormal set S of basis functions satisfies the finite duration orthogonal relation set forth in equation (3) above. The PSWFs of this basis set S are normalized to allow the use of amplitude modulation, so as to maximize utilization of the channel capacity.

Figure 2:
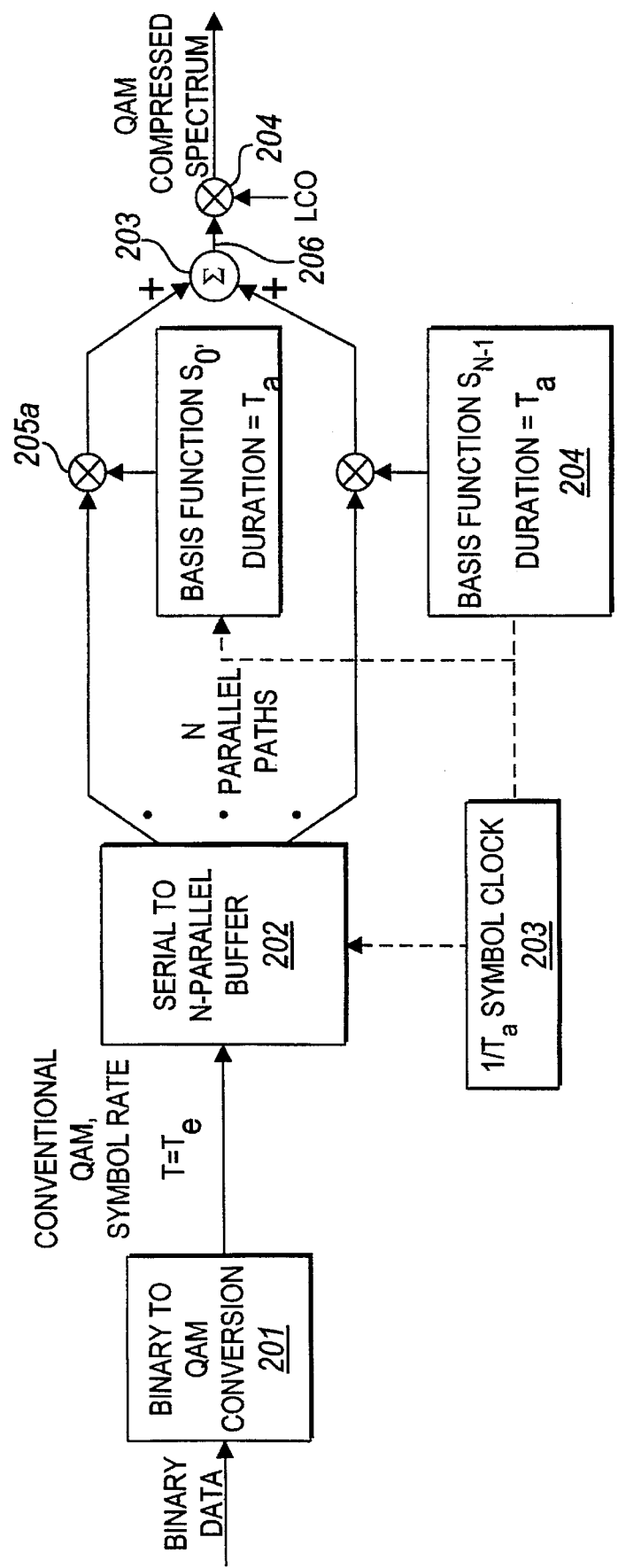
FIG. 2 is a block diagram of a transmitter 200 used in the $2^k$-QAM compressed spectrum modulation in an embodiment of the present invention.

A realization of $2^k$-QAM compressed spectrum modulation is illustrated in FIG. 2 by a block diagram of a transmitter 200. Under $2^k$-QAM compressed spectrum modulation, as in conventional $2^k$-QAM modulation, every k binary input bits are represented by one of $2^k$ amplitude/ phase symbols. Thus, as shown in FIG. 2, circuit 201 is a conventional circuit for encoding k bits of information into a conventional $2^k$-QAM symbol, represented by a predetermined combination of amplitude and phase. Block 201 provides a symbol output every time interval $T_c$. The output symbols of block 201 are queued at a serial-to-parallel buffer 202, which provides N new parallel output symbols every time interval $T_a$. For this embodiment, $T_a$ substantially equals $N*T_c$.[4] The N output symbols are each used to modulate in parallel the phase and amplitude of one of the N PSWFs of the orthonormal basis set S at circuits $205_a$, $205_b$, . . . , $205_{N-1}$, respectively. The N modulated signals are then summed by summer 203. The summed signal, which is provided on lead 206, then modulates a conventional RF carrier at circuit 204 for a time interval $T_a$.

[4]If $T_c$ is the minimum symbol duration for a conventional $2^k$-QAM implementation, the corresponding $2^k$- QAM compressed spectrum modulation scheme must not have a symbol duration shorter than $N*T_c$, according to the Nyquist condition, to avoid intersymbol interference due to aliasing.

The $2^k$-QAM compressed spectrum modulation scheme is illustrated by FIG. 1. Timing diagram 101 at the top of FIG. 1 shows 2N time intervals, each having duration $T_c$, for transmitting 2N symbols $A_0 e^{j\phi_0}$, $A_1 e^{j\phi_1}$, . . . , $A_{2N-1} e^{j\phi_{2N-1}}$ conventional $2^k$-QAM. By contrast, under $2^k$-QAM compressed modulation, as shown in timing diagram 102, the same 2N symbols are modulated with N PSWFs $S_0$, $S_1$, . . . , $S_{N-1}$ in parallel, over two time intervals of duration T, each.

From FIG. 1, it can be inferred that conventional $2^k$-QAM can be considered a special case of $2^k$-QAM compressed spectrum modulation with an orthonormal basis set consisting only of the unit step function over the symbol duration $T_c$. Under the compressed spectrum, as illustrated in FIGS. 1 and 2, two symbol and 2, two symbol periods can be defined: (a) the effective symbol period $T_c$, and (b) the apparent symbol period $T_a$. Since circuit 203's summed output signal at lead 206 modulates the carrier signal for a duration of $T_a$, the apparent symbol period is $T_a$. However, since N symbols are transmitted in parallel over the same period $T_a$, the effective symbol rate of the compressed spectrum modulation format method is $N/T_a$. When $T_a$ is equal to N times $T_c$, the effective symbol rate under $2^k$-QAM compressed spectrum modulation is optimal and the same as the symbol rate $1/T_c$ under conventional $2^k$-QAM modulation.

Figure 3:
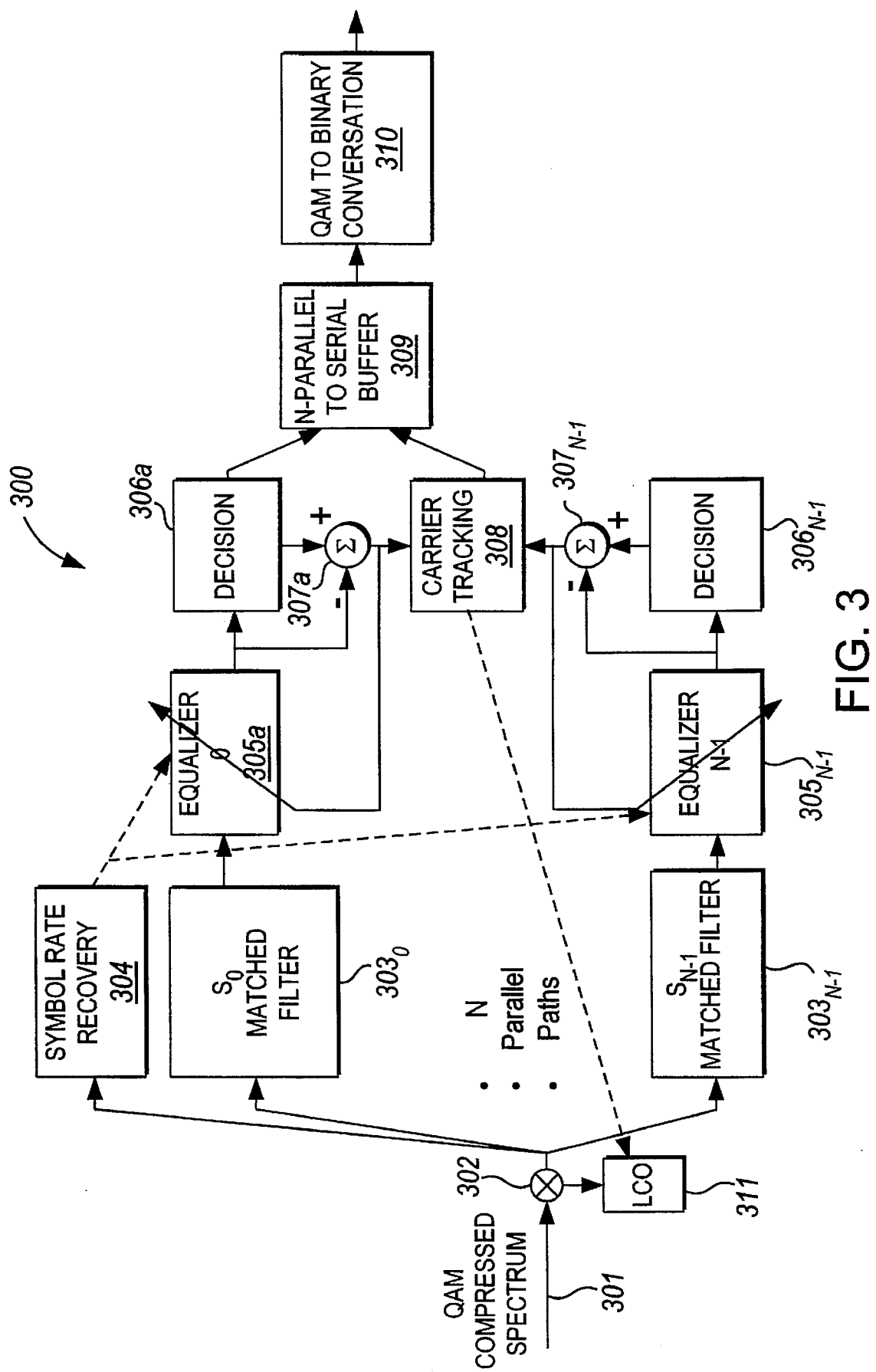
FIG. 3 is a block diagram of a receiver 300, in an embodiment of the present invention, used in demodulating a signal under a $2^k$-QAM compressed spectrum modulation scheme.

FIG. 3 is a block diagram of a receiver 300 for the $2^k$-QAM compressed spectrum modulation in an embodiment of the present invention. As shown in FIG. 3, the transmitted $2^k$-QAM compressed modulation signal is received and down-converted to base-band by a conventional RF oscillator at circuit 302. The base-band signal is then sent to a bank of N matched filters $303_0$, and $303_1$, . . . , $303_{N-1}$, each corresponding to one orthogonal waveform in the basis set $S = \{S_0, S_1, \ldots, S_{N-1}\}$ used in the pre-transmission modulation. The base-band signal can be represented by the function f(t) in the following equation:

$$f(t) = \sum_{n=0}^{N-1} a_n S_n(t)$$

where $\alpha_n$ is one of $A_0 e^{j\phi_0}$, $A_1 e^{j\phi_1}$, . . . , $A_2 e^{j\phi_2}$. Thus, using the orthogonal property set forth in equation (3) above, the n-th matched filter implements the equation:

$$a_n = \int_{-\tau}^{\tau} f(t) S_n(t) dt$$

to recover the amplitude and the phase encoded in the n-th symbol.

Each symbol output of the matched filters $303_0$, and $303_1$. . . . , $303_{N-1}$ is equalized by the corresponding one of conventional decision-feedback equalizers $305_0$, and $305_1$. . . . , $305_{N-1}$. Each equalizer receives from conventional symbol rate recovery circuit 304 the apparent symbol rate $1/T_a$, and an error signal from the corresponding one of summers $307_0$, and $307_1$, . . . , $307_{N-1}$, which computes the difference between the previous symbol decision and the corresponding equalized symbol. Symbol decision circuits $306_0$, and $306_1$, . . . , $303_{N-1}$ recover the N symbols transmitted at the end of symbol interval $T_a$, when the basis functions are substantially ideally orthogonal. The output error signals of summer $307_0$, and $307_1$, . . . , $307_{N-1}$ are provided to carrier tracking circuit 308 to provide any phase correction necessary to oscillator 311; phase corrections improve down-conversion performance. Carrier tracking circuit 308 can include a conventional phase-locked loop to perform decision-feedback carrier tracking.

The symbol decisions at symbol decision circuits $306_0$, and $306_1$, . . . , $306_{N-1}$ for the N paths are then sent to a parallel-to-serial buffer 309, which reorders the symbols recovered to resemble conventional $2^k$-QAM recovery. The subsequent symbol-to-bit conversion is performed in conventional $2^k$-QAM-to-binary conversion circuit 310.

Although FIG. 3 shows N independent adaptive equalizers $305_0$ and $305_1$, . . . , $305_{N-1}$, several approaches can still be used to improve bit error rate (BER) performance. Assuming the channel applies the same transfer characteristics to each orthogonal basis function, the corrections required at equalizers $305_a$, $305_b$, . . . , $305_{N-1}$ are related. Thus, methods which combine the adaptive filter weights of some, or all, of the equalizers can be effective. For instance, a weighted average of the equalizing filter values early in the adaptation process can speed up convergence of the adaptive equalizer weights. Although a single adaptive filter can be used for all N demodulation paths, the use of a single adaptive filter may not be optimal, since the basis functions have different spectral content and thus usually produce different, albeit similar, optimal tap weights.

Transmitter 200 and receiver 300 in FIGS. 2 and 3 are not the only apparatuses suitable for modulating and demodulating under $2^k$-QAM compressed spectrum modulation. Transmitter 200 and receiver 300 illustrate the principle of modulating and demodulating in parallel a set of orthogonal basis functions to reduce the required minimum processing speed and to increase spectral efficiency. Many variations of transmitters and receivers incorporating this parallel modulation and demodulation of orthogonal basis functions within the scope of the present invention are possible.

Theoretically, $2^k$-QAM compressed spectrum modulation has a bit error rate (BER) equal to the BER of conventional $2^k$-QAM. In practice, however, due to imperfect baud and carrier tracking and white Gaussian noise in the channel, some intersymbol interference can occur. Performance of the $2_k$-QAM compressed spectrum modulation format in real environments can vary.

Figure 4:
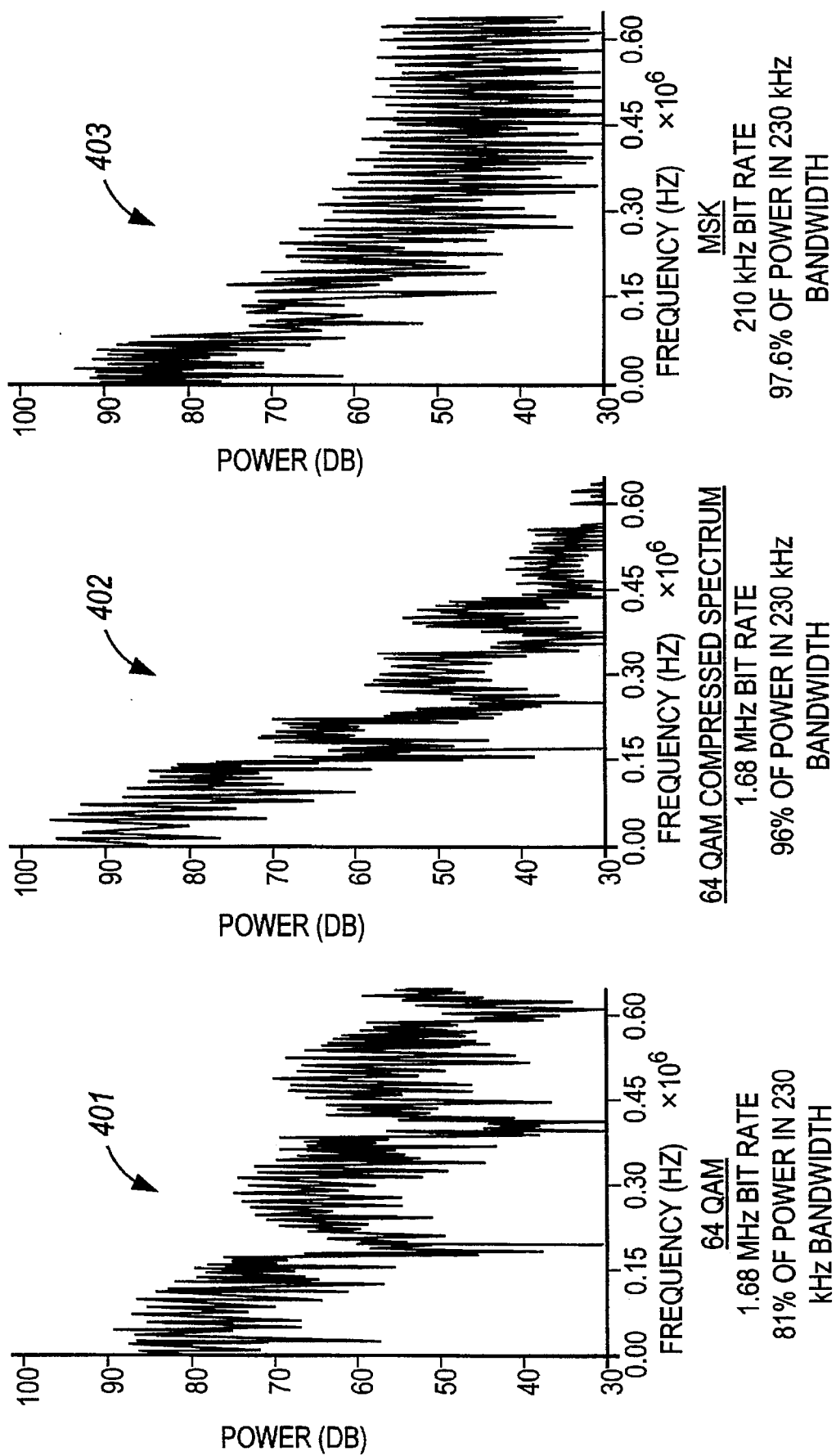
FIG. 4 shows the spectral efficiency of $2^k$-QAM compressed spectrum modulation, as compared to the spectral efficiencies under conventional QAM and MSK modulations.

An example of the spectral efficiency of the compressed spectrum modulation of the present invention is illustrated in FIG. 4. In FIG. 4, the baseband spectra of three modulation formats are displayed in graphs 401, 402 and 403. The signals on which graphs 401, 402 and 403 are based were sent in a 230 KHz channel. The desired bit rate was 1.68 MHz, so as to yield a channel use factor of 7.3 bits/Hz. The spectral efficiency was determined by measuring the percentage of signal power within the 230 KHz bandwidth of the channel; the remaining power was presumed lost due to channel bandlimiting. In graph 401, representing the spectrum under a conventional 64-QAM, the channel use factor attained the required 7.3 bits/Hz. Graph 401 shows that 81% of the power in the transmitted signal is transmitted within the bandwidth of the channel. By contrast, as shown in Graph 402, under the 64-symbol QAM compressed spectrum format of the present invention, 96% of the power in the transmitted signal resides within the channel bandwidth, while achieving the required channel use factor of 7.3 bits/Hz. Further, since the side-lobes in the power spectrum of the 64-symbol QAM compressed spectrum modulation outside the 230K-Hz channel bandwidth is approximately 20 dB below the corresponding power level within the channel bandwidth, filtering to eliminate adjacent channel interference is not necessary in some applications. The corresponding power difference between the ranges of frequencies inside and outside of the channel bandwidth in the conventional 64-QAM is approximately 10 dB. Thus, 64-symbol QAM compressed spectrum modulation is shown to be more spectrally efficient and requires less filtering than conventional 64-QAM.

Of interest is the spectrum displayed in Graph 403, corresponding to a minimum shift-keying (MSK) spectrum. The MSK format is known to be spectrally efficient, as demonstrated by the fact that 98% of the power in the transmitted signal resides within the channel bandwidth. However, MSK attained only a channel use factor of 0.9 bits/Hz, falling short of desired channel use factor of 7.3 bits/Hz. Thus, FIG. 4 shows that $2^k$-QAM compressed spectrum modulation achieves simultaneously superior spectral efficiency and higher channel use.

As demonstrated above, under compressed spectrum modulation of the present invention, the N waveforms which are sent in parallel can be sent at 1/N of a corresponding serial symbol rate, without affecting the overall effective symbol rate. Consequently, equipment slower than that necessary for serial transmission at the same effective symbol rate can be used under compressed spectrum modulation to generate and recover the information carried in each waveform, thereby resulting in a simpler and lower cost system. In addition, transmitter 200 and receiver 300 described above are well-suited for implementation in parallel digital signal processing (DSP) architecture. For example, a suitable DSP architecture is the RACE series multicomputers, available from Mercury Computer Systems, Chelmsford, Mass.

Since the compressed spectrum modulation of the present invention does not require filtering of the base-band signal prior to transmission, intersymbol interference resulting from filtering the symbols under a method for simultaneous transmission of orthogonal sinusoids is avoided. Further, because the compressed spectrum modulation under the present invention does not require symbol filtering, compressed spectrum modulation can be simply applied to a single data stream.

The compressed spectrum modulation format of the present invention also allows greater privacy protection in transmission. Such protection increases its applicability in many secured applications where the interception and the demodulation of the signal by unintended receivers are not desired. The compressed spectrum modulation of the present invention achieves higher security because of three characteristics of compressed spectrum modulation. First, most digital modulation formats have a repetitive symbol rate which can be easily detected and used to demodulate the signal. Although compressed spectrum has a repetitive symbol rate, the dynamics of the basis functions can cause a conventional symbol rate detector to incorrectly sense a higher symbol rate. Secondly, the spectrum of the received signal is dependent on the number of basis functions applied in parallel, as well as the spectra of the orthogonal functions themselves. Thus, the steps of identifying the signal as a compressed spectrum modulated signal and then further identifying each of the functions in the basis set used are difficult. Third, under a compressed spectrum modulation, successful demodulation requires a priori knowledge of the basis set so that the matched filter bank can be created to demodulate the symbols.

In choosing a basis function set under the present invention, several factors are considered. First, the spectral energy of each basis function must be sufficiently "low-pass" (i.e. limited in frequency), so that distortion caused by channel bandlimiting (i.e. the channel's inability to transmit high frequency signals) is minimal. In the basis set discussed above, the PSWFs are ordered such that the higher order functions have higher "dynamics". In other words, the higher order functions have increasingly higher frequency components. If N functions ($S_0, \ldots, S_{N-1}$) of a basis set can be chosen such that each function is sufficiently low-pass in relation to undesirable channel distortion, those N functions are suitable for use in the present invention.

Another consideration is spectral efficiency. In addition to the low-pass characteristics, it is also desirable to choose a basis set that occupies the available bandwidth more completely than other basis sets, so as to achieve higher spectral efficiency. High spectral efficiency results in minimizing the energy loss in a filtering process, since a higher percentage of the signal's energy is concentrated in the pass-band of the filter. In fact, as mentioned above, under the $2^k$-QAM compressed spectrum modulation scheme, the side-lobes of the power spectrum is sufficiently attenuated that no filtering is likely to be required in many applications, thereby avoiding distortion by the pretransmission filter, if any, and simplifying the equalization requirements at the receiver.

The transfer characteristics of the specific channel should also be considered in choosing a basis function set. Specifically, the transfer characteristics of a channel can distort the individual waveforms of a basis function set differently. Accordingly, both the basis set and the modulation scheme should be chosen to conform to the channel transfer characteristics, so as to minimize distortion. For instance, if non-linear amplification is present in the channel, a modulation scheme including amplitude modulation should be carefully crafted. As another example, if the channel has notches in the frequency spectrum, then a basis function having much of its energy in such frequency notches should be avoided. The present invention enjoys the flexibility of being able to tailor individual basis functions to the channel transfer characteristics to achieve an overall optimal system. For example, each basis function can be modulated by a variable number of QAM states, depending upon whether the basis function has its energy concentrated near the band edges of the channel, where there are greater distortion, or within a relatively linear portion of the channel, where distortion can be relatively easily compensated. Under such a system, for example, the basis functions at the band-edges can each be modulated under a 4-QAM scheme. In contrast, basis functions at the center of the channel's frequency spectrum can be modulated under a relatively more sophisticated 32-QAM scheme. Such a system would, as a result of the modulation scheme'l scheme enjoy the additional benefit of added security against unintended signal recipients.

However, improved performance of a basis function set must be considered in light of computational complexity of modulating and demodulating the orthogonal waveforms. For example, computational complexity may affect the choice of N, i.e. the number of bits of information, to be transmitted in parallel.

The above detailed description is provided to illustrate the specific embodiments of the present invention and is not intended to be limiting. Numerous modifications and variations within the scope of the present invention are possible. For example, although PSWFs are used to illustrate the present invention, other orthogonal functions can also be adapted for the present invention. Such orthogonal functions are not limited to real value functions, encompassing, in general, complex-value functions as well. Further, although QAM is used as the modulation technique, the present invention can also be practiced using other amplitude or phase modulations (e.g. PSK) on the basis functions, instead of both phase and amplitude used in the above described embodiments. The present invention is defined by the following claims.

I claim:

1. A method for digital signal transmission, comprising the steps of:
   encoding in each of N symbols a plurality of data bits under a conventional coding scheme;
   modulating each of said N symbols for a predetermined time interval onto a corresponding one of N substantially band limited finite duration orthogonal waveforms;
   summing each of said N modulated waveforms, aligned in time, to obtained a summed waveform;
   modulating said summed waveform for said predetermined time interval onto a carrier signal; and
   transmitting said modulated summed waveform in a communication channel.

2. A method as in claim 1, wherein said N optional orthogonal waveforms are selected from the set of prolate spheroidal wave functions.

3. A method as in claim 1, wherein said step of encoding said plurality of data bits encodes said plurality of bits into a symbol represented by a phase and an amplitude of a signal.

4. A method as in claim 3, wherein said step of modulating each of said N symbols modulates said phase and said amplitude of said corresponding optimal orthogonal waveform.

5. A method as in claim 1, wherein each of said optional orthogonal waveforms has a spectrum width less than the bandwidth of said channel.

6. A method as in claim 1, further comprising the steps of:
   receiving said transmitted signal;
   down-converting said transmitted signal to a baseband signal; and
   recovering said N symbols using N matched filters in parallel, each matched filter matching a corresponding one of said optional orthogonal waveforms.

7. A method as in claim 6, wherein said step of recovering said N symbols comprises the step of using a decision device.

8. A method as in claim 6, wherein said step of recovering comprises the step of applying an equalizer on the output signal of each of said matched filters.

9. A method as in claim 8, wherein said equalizer is an adaptive equalizer using decision-feedback.

10. A method as in claim 1, wherein said method encodes symbols and selects said optional orthogonal waveform in accordance with a scheme which conforms to the transfer characteristics of said communication channel.

11. A method as in claim 10, wherein, when said communication channel has a notch in a passband, said N optimal orthogonal waveforms are selected such that none of said optimal orthogonal waveforms has energy concentrated on within a predetermined distance of said notch.

12. A method as in claim 10, wherein said scheme associates more symbols to waveforms in said N optional orthogonal waveforms having energies concentrated at the midrange of a passband of said communication channel than waveforms in said N optional orthogonal waveforms having energies concentrated at the edges of said passband.

13. A method as in claim 10, wherein said scheme provides amplitude modulation where said transfer characteristics of said channel is linear.

14. A circuit for digital signal transmission, comprising:
   an encoder encoding in each of N symbols a plurality of data bits under a conventional coding scheme;
   a plurality of first modulating circuits, each first modulating circuit modulating one of said N symbols for a predetermined time interval onto a corresponding one of N substantially band-limited finite duration orthogonal waveforms;
   a summing circuit, coupled to receive each of said N modulated waveforms, for obtaining a summed waveform;
   a second modulating circuit, coupled to receive said summed waveform, for modulating said summed waveform for said predetermined time interval onto a carrier signal; and
   a transmitter circuit, coupled to receive said said modulated summed waveform, for transmitting said summed waveform in a communication channel.

15. A circuit as an claim 14, wherein each of said optional orthogonal waveforms has a spectrum width less than the bandwidth of said channel.

16. A circuit as in claim 14, further comprising a buffer having N entries for storing each of said symbols, said buffer providing said N symbols in parallel to allow modulating said symbols onto said optional orthogonal waveforms to occur simultaneously.

17. A circuit as an claim 14, wherein said N optional orthogonal waveforms are selected from the set of prolate spheroidal wave functions.

18. A circuit as an claim 14, wherein said encoder encodes said plurality of bits into a symbol represented by a phase and an amplitude of a signal.

19. A circuit as in claim 18, wherein each of said first modulating circuits modulates said phase and said amplitude of said corresponding optional orthogonal waveform.

20. A circuit as an claim 14, further comprising:
   means for receiving said transmitted signal;
   a down-converting circuit for down-converting said transmitted signal to a baseband signal; and
   N matched filters for recovering said N symbols in parallel, each matched filter matching a corresponding one of said optional orthogonal waveforms.

21. A circuit as in claim 20, further comprising an equalizer equalizing the output signal of each of said matched filters.

22. A circuit as in claim 21, said equalizer is an adaptive equalizer using decision-feedback.

23. A circuit as in claim 20, further comprising a decision device.

* * * * *

UNITED STATES PATENT AND TRADEMARK OFFICE
CERTIFICATE OF CORRECTION

PATENT NO.    :   5,640,423
DATED         :   June 17, 1997
INVENTOR(S)   :   Archer, Teri L.

It is certified that error appears in the above-identified patent and that said Letters Patent is hereby corrected as shown below:

Col. 5, Equation (1) delete "$\phi$" both occurrences and insert --$\Psi$--

Col. 6, Equations (2) and (3) delete "$\phi$" and insert --$\Psi$--

Col. 6, line 9 delete "$\phi_k$ and $\phi_n$" and insert --$\Psi_k$ and $\Psi_n$--

Col. 8, line 37 delete "$305_a$, $305_b$," and insert --$305_0$, $305_1$, --

Col. 10, lines 16 and 17, Col. 11, line 3 after "i.e." insert --,--

Col. 11, line 43 delete "optimal"
Col. 11, line 45 delete "optional"
Col. 11, line 55 delete "optional"
Col. 11, line 64 delete "optional"
Col. 12, line 3 delete "optimal"
Col. 12, line 7 delete "optional"
Col. 12, line 10 delete "optional"
Col. 12, line 35 delete "optional"
Col. 12, line 41 delete "optional"
Col. 12, line 42 delete "optional"
Col. 12, line 50 delete "optional"

UNITED STATES PATENT AND TRADEMARK OFFICE
CERTIFICATE OF CORRECTION

PATENT NO. : 5,640,423
DATED : June 17, 1997
INVENTOR(S) : Archer, Teril

It is certified that error appears in the above-identified patent and that said Letters Patent is hereby corrected as shown below:

Col. 12, line 57 delete "optional"

Signed and Sealed this

Tenth Day of February, 1998

Attest:

BRUCE LEHMAN

Attesting Officer

Commissioner of Patents and Trademarks